(12) United States Patent
Yan et al.

(10) Patent No.: US 10,140,276 B1
(45) Date of Patent: Nov. 27, 2018

(54) SYSTEM AND METHOD FOR DYNAMICALLY GENERATING CLIENT-SIDE DATABASE FORMS

(71) Applicant: Dell Software Inc., Aliso Viejo, CA (US)

(72) Inventors: Xilang Yan, Zhuhai (CN); Yinghua Qin, Zhuhai (CN)

(73) Assignee: Quest Software Inc., Aliso Viejo, CA (US)

(*) Notice: Subject to any disclaimer, the term of this patent is extended or adjusted under 35 U.S.C. 154(b) by 300 days.

(21) Appl. No.: 14/248,234

(22) Filed: Apr. 8, 2014

(51) Int. Cl.
| | |
|---|---|
| G06F 17/24 | (2006.01) |
| H04L 29/06 | (2006.01) |
| G06F 17/30 | (2006.01) |
| H04L 29/08 | (2006.01) |

(52) U.S. Cl.
CPC ...... *G06F 17/243* (2013.01); *G06F 17/30595* (2013.01); *G06F 17/30896* (2013.01); *H04L 67/02* (2013.01); *H04L 67/42* (2013.01)

(58) Field of Classification Search
CPC .................................................... G06F 17/00
See application file for complete search history.

(56) References Cited

U.S. PATENT DOCUMENTS

| | | | | |
|---|---|---|---|---|
| 6,035,300 | A * | 3/2000 | Cason ............... | G06F 17/30604 |
| 6,243,711 | B1 * | 6/2001 | Wu ...................... | G06F 9/4443 |
| 6,738,077 | B1 * | 5/2004 | Wendker ............. | G06F 17/3056 |
| | | | | 707/E17.005 |
| 8,132,113 | B2 | 3/2012 | Khan et al. | |
| 8,275,855 | B2 | 9/2012 | Kothari et al. | |
| 8,375,358 | B2 | 2/2013 | Baldwin et al. | |
| 2002/0059425 | A1 * | 5/2002 | Belfiore ................... | G06F 9/54 |
| | | | | 709/226 |
| 2002/0143819 | A1 * | 10/2002 | Han ..................... | G06F 17/3089 |
| | | | | 715/237 |
| 2006/0106897 | A1 * | 5/2006 | Sapozhnikov ............ | G06F 8/38 |
| 2007/0022093 | A1 * | 1/2007 | Wyatt ............... | G06F 17/30592 |
| 2007/0055924 | A1 * | 3/2007 | Farr ...................... | G06F 17/243 |
| | | | | 715/207 |
| 2007/0282869 | A1 * | 12/2007 | Paulus .............. | G06F 17/30893 |

(Continued)

OTHER PUBLICATIONS iTunes and Android Applications from Wayback Machine (https://archive.org/web/).*

(Continued)

*Primary Examiner* — Frank D Mills
(74) *Attorney, Agent, or Firm* — Winstead PC (57) ABSTRACT

In one embodiment, a method includes serving a webpage comprising a reference to a network location of a form-generator client application to a client device. Additionally, the method includes receiving a request from the client device for the form-generator client application and supplying the form-generator client application to the client device. In addition, the method includes receiving a request for an entity schema of at least one database entity of the plurality of database entities. The method further includes transmitting a standardized schema to the loaded form-generator client application so that a client-side database form can be dynamically generated. In addition, the method includes interacting with the dynamically-generated client-side database form to perform one or more persistent storage operations.

20 Claims, 6 Drawing Sheets

(56) References Cited

U.S. PATENT DOCUMENTS

| | | | |
|---|---|---|---|
| 2009/0083616 A1* | 3/2009 | Ali | G06F 17/243 |
| | | | 715/222 |
| 2009/0164500 A1* | 6/2009 | Mathur | G06F 17/227 |
| 2011/0131273 A1* | 6/2011 | Merissert-Coffinires | |
| | | | G06F 8/00 |
| | | | 709/203 |
| 2011/0302316 A1 | 12/2011 | Chou et al. | |
| 2012/0036421 A1* | 2/2012 | Ahn | G06F 17/2264 |
| | | | 715/223 |
| 2012/0173607 A1 | 7/2012 | Connan et al. | |
| 2013/0055060 A1* | 2/2013 | Folsom | G06F 17/2247 |
| | | | 715/222 |
| 2014/0250166 A1* | 9/2014 | Desai | H04L 67/16 |
| | | | 709/203 |
| 2014/0281883 A1* | 9/2014 | Burckart | G06F 17/30893 |
| | | | 715/234 |

OTHER PUBLICATIONS

Jayapandian, Magesh, and H. V. Jagadish. "Automated creation of a forms-based database query interface." Proceedings of the VLDB Endowment 1.1 (2008): 695-709. (Year: 2008).*

Richardson, Leonard, "RESTful Web Services," http://www.crummy.com/writing/RESTful-Web-Services/, last modified Jul. 10, 2007, 6 pages.

* cited by examiner

```
<entity name="company">
    <fields>
        <field name="name" type="string">
            <constraints>
                <constraint type="nullable" value="false"/>
                <constraint type="size" value="1...20"/>
            </constraints>
        </field>
        <field name="addresses" type="list">
            <fields>
                <field name="country" type="string">
                    <constraints>
                        <constraint type="nullable" value="false"/>
                        <constraint type="size" value="1...20"/>
                    </constraints>
                </field>
                <field name="city" type="string"/>
                <field name="street" type="string"/>
            </fields>
        </field>
    </fields>
    <rest-urls>
        <rest-url type="create" url="http://rest-server/company/create"/>
        <rest-url type="update" url="http://rest-server/company/update"/>
    </rest-urls>
</entity>
```

SYSTEM AND METHOD FOR DYNAMICALLY GENERATING CLIENT-SIDE DATABASE FORMS

BACKGROUND

Technical Field

The present invention relates generally to form generation and more particularly, but not by way of limitation, to systems and methods for dynamic form generation.

History of Related Art

Database forms are often used to facilitate entry of data into a database. Database forms can include, for example, graphical user interfaces (GUIs) that acquire data manipulations from users and communicates those data manipulations to a database server. It is commonplace for developers to create such database forms manually, for example, by directly referencing data objects or entities such as Java persistence entities. However, such manual creation introduces development cost, takes time, is error prone, and makes system maintenance difficult.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on a backend computing system comprising at least one server computer, centrally maintaining a plurality of form-generator client applications. The method further includes centrally maintaining a plurality of entity adapters, each entity adapter providing a standard interface to at least one of a plurality of database entities. The method also includes allowing a user of a client device to select a form-generation category from a plurality of form-generation categories. In addition, the method includes identifying a form-generator client application of the plurality of form-generator client applications that is appropriate for the form-generation category. Moreover, the method includes generating a webpage comprising a reference to a network location of the form-generator client application. Further, the method includes serving the webpage to the client device. Additionally, the method includes receiving, at the network location, a request from the client device for the form-generator client application. Also, the method includes supplying the form-generator client application to the client device so that the form-generator client application can be loaded on the client device. In addition, the method includes receiving, from the loaded form-generator client application, a request for an entity schema of at least one database entity of the plurality of database entities. The method also includes acquiring, using an entity adapter of the plurality of entity adapters that is associated with the at least one database entity, a standardized schema for the at least one database entity. The method further includes transmitting the standardized schema to the loaded form-generator client application so that a client-side database form can be dynamically generated. In addition, the method includes interacting with the dynamically-generated client-side database form to perform one or more persistent storage operations relative to the at least one database entity.

In one embodiment, an information handling system includes a processing unit, wherein the processing unit is operable to implement a method. The method includes centrally maintaining a plurality of form-generator client applications. The method further includes centrally maintaining a plurality of entity adapters, each entity adapter providing a standard interface to at least one of a plurality of database entities. The method also includes allowing a user of a client device to select a form-generation category from a plurality of form-generation categories. In addition, the method includes identifying a form-generator client application of the plurality of form-generator client applications that is appropriate for the form-generation category. Moreover, the method includes generating a webpage comprising a reference to a network location of the form-generator client application. Further, the method includes serving the webpage to the client device. Additionally, the method includes receiving, at the network location, a request from the client device for the form-generator client application. Also, the method includes supplying the form-generator client application to the client device so that the form-generator client application can be loaded on the client device. In addition, the method includes receiving, from the loaded form-generator client application, a request for an entity schema of at least one database entity of the plurality of database entities. The method also includes acquiring, using an entity adapter of the plurality of entity adapters that is associated with the at least one database entity, a standardized schema for the at least one database entity. The method further includes transmitting the standardized schema to the loaded form-generator client application so that a client-side database form can be dynamically generated. In addition, the method includes interacting with the dynamically-generated client-side database form to perform one or more persistent storage operations relative to the at least one database entity.

In one embodiment, a computer-program product includes a non-transitory computer-usable medium having computer-readable program code embodied therein. The computer-readable program code adapted to be executed to implement a method. The method includes centrally maintaining a plurality of form-generator client applications. The method further includes centrally maintaining a plurality of entity adapters, each entity adapter providing a standard interface to at least one of a plurality of database entities. The method also includes allowing a user of a client device to select a form-generation category from a plurality of form-generation categories. In addition, the method includes identifying a form-generator client application of the plurality of form-generator client applications that is appropriate for the form-generation category. Moreover, the method includes generating a webpage comprising a reference to a network location of the form-generator client application. Further, the method includes serving the webpage to the client device. Additionally, the method includes receiving, at the network location, a request from the client device for the form-generator client application. Also, the method includes supplying the form-generator client application to the client device so that the form-generator client application can be loaded on the client device. In addition, the method includes receiving, from the loaded form-generator client application, a request for an entity schema of at least one database entity of the plurality of database entities. The method also includes acquiring, using an entity adapter of the plurality of entity adapters that is associated with the at least one database entity, a standardized schema for the at least one database entity. The method further includes transmitting the standardized schema to the loaded form-generator client application so that a client-side database form can be dynamically generated. In addition, the method includes interacting with the dynamically-generated client-side database form to perform one or more persistent storage operations relative to the at least one database entity.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Various embodiments described herein enable dynamic generation of client-side database forms so that storage operations on persistent data can be more easily and reliably performed. In a typical embodiment, the particulars of how the persistent data is stored and managed can be abstracted from both systems involved in dynamically generating the database forms and the database forms themselves. Thereafter, the dynamically-generated client-side database forms can interact with a standard interface to perform the storage operations.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
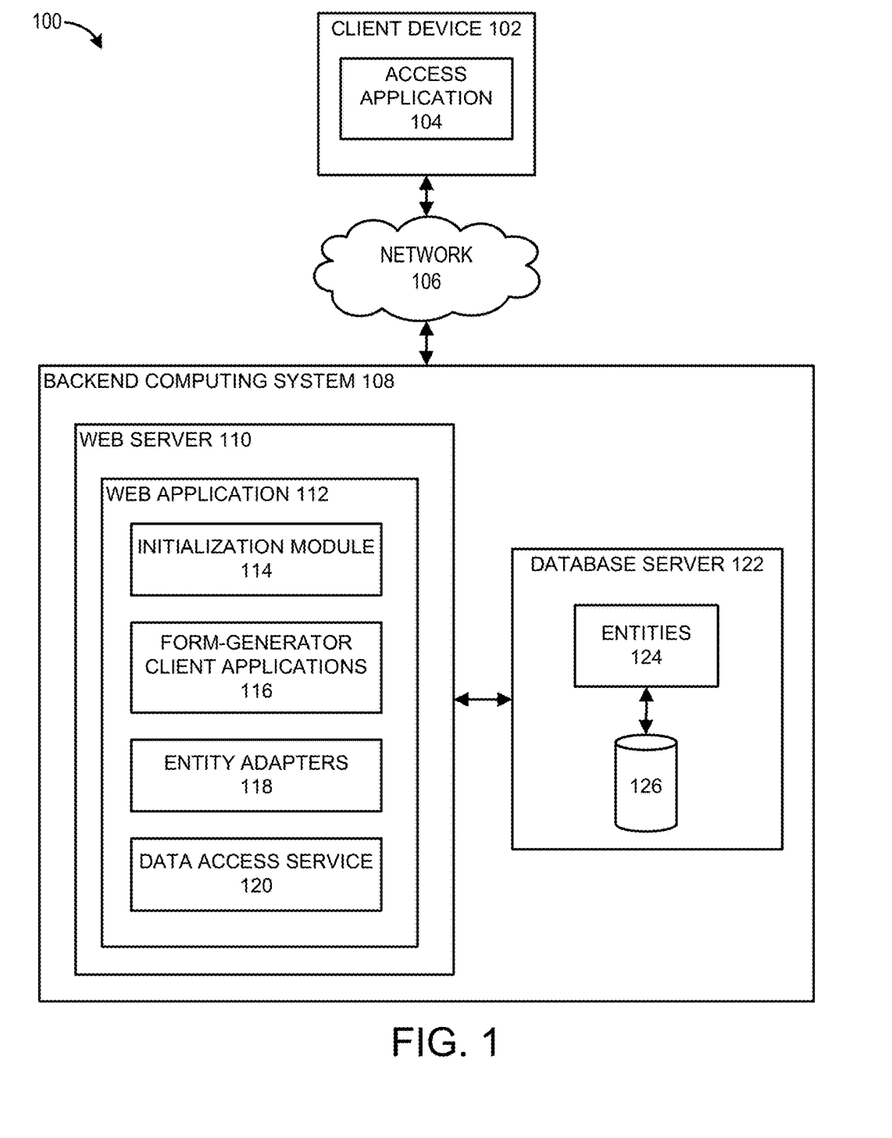
FIG. 1 illustrates an example of a system for dynamically generating client-side database forms.

FIG. 1 illustrates an example of a system 100 for dynamically generating client-side database forms and enabling persistent storage operations on a dataset. The system 100 includes a client device 102 and a backend computing system 108. The client device 102 and the backend computing system 108 are operable to communicate over a network 106 such as, for example, the Internet, a corporate intranet or extranet, and/or the like.

As shown, the client device 102 is an information handling system that is operable to execute an access application 104. In a typical embodiment, the access application 104 is representative of any software application that can be used to facilitate locating and/or contacting of the backend computing system 108. For example, in some embodiments, the access application 104 can be a platform-specific native application such as a web-browser application.

The backend computing system 108 includes a web server 110 and a database server 122 communicably coupled thereto. In general, the web server 110 is operable to execute a web application 112 that oversees and coordinates dynamic client-side form generation. In the depicted embodiment, the web application 112 includes an initialization module 114, a set of form-generator client applications 116, a set of entity adapters 118, and a data access service 120. The initialization module 114, the set of form-generator client applications 116, the set of entity adapters 118, and the data access service 120 will be described in greater detail below.

The database server 122 is an information handling system that includes database entities 124 and a database 126. In a typical embodiment, each of the database entities 124 logically represents data stored in the database 126. States of the database entities 124 are typically stored in the database 126. For example, in certain embodiments, a given database entity of the database entities 124 can correspond to a table in the database 126 while a particular instance of the given database entity can correspond to a row in the table. The table can be, for example, a relational table in a relational database, although the principles described herein are not limited to relational databases.

The database entities 124 can be persistent database entities such as, for example, Java persistence entities. In various embodiments, the database entities 124 may relate to heterogeneous web-application frameworks such as, for example, Grails, Rails, Hibernate, and/or the like. Thus, the database entities 124 can each utilize different schema formats, provide syntactically distinct interfaces for accessing data represented thereby, store different types of data, etc. In addition, certain ones of the database entities 124 can include others of the database entities, for example, by aggregation and/or composition.

Referring now to the web application 112, the initialization module 114 is a software module that can be used by the web application 112 to initiate dynamic client-side form generation. The initialization module 114 is typically accessed by the access application 104 over the network 106. In a typical embodiment, the initialization module 114 provides an initialization interface via which a user of the access application 104 can make a request to dynamically generate a client-side database form.

In a typical embodiment, the initialization module 114 facilitates the initialization interface by exchanging messages with the access application 104. For illustrative purposes, examples will be provided such that the initialization module 114 generates and serves messages via webpages. However, it should be appreciated that other forms of messaging between the access application 104 and the initialization module 114 can also be utilized.

In a typical embodiment, the initialization module 114 generates and serves webpages that allow the user to select a form-generation category from one or more lists of form-generation categories. The form-generation categories can include, for example, names of particular databases or database tables, one or more functional categories of data (e.g. "employee data," "sales data," etc.), and/or the like. In this fashion, the user can specify a form-generation category and thereby make the request to dynamically generate a client-side database form.

The form-generator client applications 116 are software applications that, when loaded on the client device 102, can dynamically generate client-side database forms based on input data. In certain embodiments, each of the form-generator client applications 116 can include a script (e.g., JavaScript, ActionScript, Dart, VBScript, etc.), a presentation format for a database form (e.g., a cascading style sheet (CSS)), images, and/or other data. The input data from which the client-side database forms are generated can include, for example, initialization parameters (e.g., data for at least partially populating a database form), an entity schema of one or more of the database entities 124, and/or the like. In various embodiments, the form-generator client applications 116 can execute within or in conjunction with the access application 104 (e.g., within a web browser) or separately therefrom.

In a typical embodiment, the form-generator client applications 116 are centrally maintained by the backend computing system 108. In general, each is designed to dynamically generate client-side database forms for at least one form-generation category such as, for example, one or more of the form-generation categories described above. For instance, one of the form-generator client applications 116 could be used to generate a database form for performing persistent storage operations on human-resources data that is stored by employee, while another of the form-generator client applications could be used for performing persistent storage operations on sales data that is stored by client, etc.

The entity adapters 118 each serve to provide a standard interface for accessing at least one of the database entities 124. As described above, the database entities 124 may relate to numerous heterogeneous web-application frameworks. In a typical embodiment, each of the entity adapters 118 adapts, among other things, to an access method, syntax, and schema format of a particular database entity of the database entities 124. Thus, each of the entity adapters 118 can translate functionality of the standard interface into corresponding calls to the particular database entity. In addition, in a typical embodiment, each of the entity adapters can translate an entity schema of the particular database entity into a standardized schema having a standardized schema format using XML, JSON, and/or the like.

By way of example, the entity adapters 118 could include an adapter for Hibernate, an adapter for Grails, and an adapter for Rails. According to this example, the adapter for Hibernate, the adapter for Grails, and the adapter for Rails would adapt to technical details specific to Hibernate, Grails, and Rails, respectively, for purposes of providing the standard interface and generating the standardized entity schema. In some cases, an interface and schema format of one of the web-application frameworks (e.g., Hibernate, Grails, or Rails) can be adopted as the standardized interface and the standardized schema format, respectively.

The data access service 120 typically provides an application programming interface (API) such as, for example, a web API, for performing a set of persistent storage operations on one or more of the database entities 124. In various embodiments, the data access service 120 may utilize the entity adapters 118 to access the database entities 124. In other embodiments, the data access service 120 self-contains all technical details necessary for communicating with the database entities 124. In general, the data access service 120 can be called by any client-side database form dynamically generated by one of the form-generator client applications 116. The set of persistent storage operations can include, for example, create, read, update, and delete (CRUD) operations. In some embodiments, and as described in greater detail below, the set of persistent storage operations can be intentionally restricted to CRUD operations.

In various embodiments, the data access service 120 can conform to certain constraints of representational state transfer (REST). In these embodiments, the data access service 120, among other things, has a base URI (e.g., of the form http://dell.com/resources), communicates using a standard media type (e.g., JSON or XML), defines the set of persistent storage operations in terms of HTTP methods (e.g., GET, PUT, POST, or DELETE), and is hypertext driven. If the data access service 120 meets the above-described constraints, the data access service 120 may be referred to herein as a RESTful service.

Figure 2:
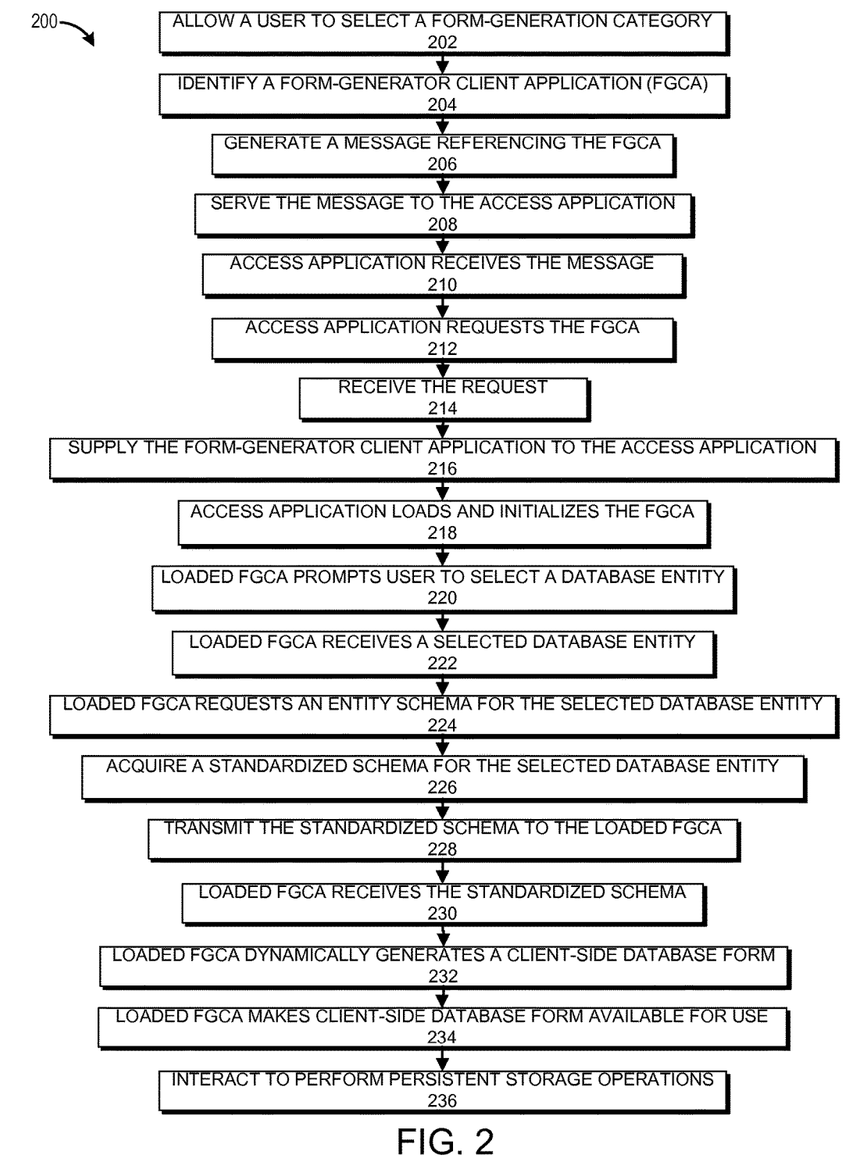
FIG. 2 illustrates an example of a process for dynamically generating a client-side database form.

FIG. 2 presents a flowchart of an example of a process 200 for dynamically generating a client-side database form. The process 200 can be implemented by any system that can access one or more data sources. For example, the process 200, in whole or in part, can be implemented by one or more of the web server 110, the web application 112, the initialization module 114, the form-generator client applications 116, the entity adapters 118, the data access service 120, the database server 122, the database entities 122, and the database 126. The process 200 can also be performed generally by the backend computing system 108. Although any number of systems, in whole or in part, can implement the process 200, to simplify discussion, the process 200 will be described in relation to specific systems or subsystems of the system 100.

At block 202, the initialization module 114 allows a user of the client device 102 to select a form-generation category from a plurality of form-generation categories. In various embodiments, the block 202 includes the initialization module 114 generating and serving one or more webpages to the access application 104. In addition, in some embodiments, the form-generation categories can be arranged hierarchically so that the user can drill down through multiple levels or layers in order to select the form-generation category.

At block 204, the initialization module 114 identifies a form-generator client application of the form-generator client applications 116 that is appropriate for the selected form-generation category. In a typical embodiment, each of the form-generation categories is associated with or mapped to one of the form-generator client applications 116. Therefore, the identified form-generator client application can be the form-generator client application in the form-generator client applications 116 that is associated with or mapped to the selected form-generation category. In some embodiments, some form-generation categories may be associated with or mapped to more than one of the form-generator client applications 116. In these embodiments, other criteria can be applied such as, for example, an upload date (e.g., so that preference can be given to more recent uploads).

Figure 3:
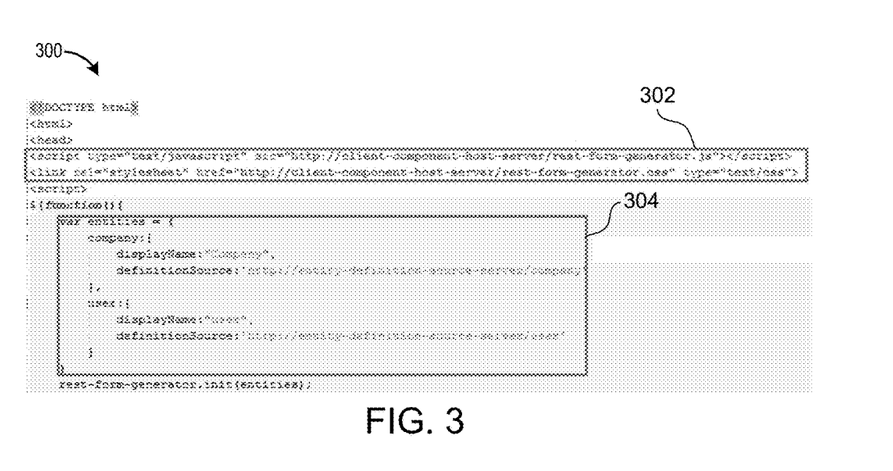
FIG. 3 illustrates an example of a web page that includes a reference to a network location of a form-generator client application.

At block 206, the initialization module 114 generates a message such as, for example, a webpage, that includes a reference to a network location of the identified form-generator client application and initialization parameters. The reference can be, for example, a uniform resource locator (URL). In some cases, when multiple parts of the identified form-generator client application are not accessed via a common network location, the webpage can include a reference to each part. For example, the webpage can include a reference to a network location of a script, a network location of a style sheet, a network location of images, etc. FIG. 3 illustrates an example of a web page 300 that includes a reference 302 to a network location of a script, a network location of a style sheet, and a network location of images. The web page 300 also illustrates initialization parameters 304.

The initialization parameters typically include data needed for the identified form-generator client application to operate appropriately. For example, in some cases, the identified form-generator client application may be operable to generate database forms relating to more than one of the database entities 124. In such cases, the initialization parameters could include a listing of database entities from the database entities 124 that the identified form-generator client application is operable to serve.

At block 208, the initialization module 114 serves the message to the access application 104. At block 210, the access application 104 receives the message. At block 212, the access application 104 requests the identified form-generator client application using the network location(s) included in the webpage. At block 214, the web application 112 receives the request(s) at the network location(s). At block 216, the web application 112 supplies the identified form-generator client application to the access application 104. At block 218, the identified form-generator client application is loaded and initialized using, for example, the initialization parameters. In some embodiments, the identified form-generator client application can be executed within the access application 104.

Figure 4:
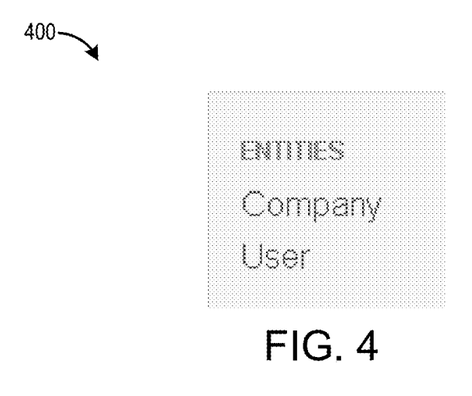
FIG. 4 illustrates an example of a prompt for selecting database entities.

At block 220, the loaded form-generator client application prompts the user to select a database entity for which it is desired to perform persistent storage operations. The prompt typically includes the listing of database entities from the initialization parameters. FIG. 4 illustrates an example of a prompt 400 for selecting database entities. In the case of the prompt 400, the user is prompted to choose between a database entity of "Company" and a database entity of "User."

At block 222, the loaded form-generator client application receives a selected database entity. At block 224, the loaded form-generator client application requests an entity schema for the selected database entity. In some embodiments, the loaded form-generator application knows which entity adapter of the entity adapters 118 is associated with the selected database entity and directly requests the entity schema from that entity adapter. In other embodiments, the loaded form-generator application may not know which of the entity adapters 118 is associated with the selected database entity or a network location thereof. In these embodiments, the loaded form-generator application may request the entity schema from the initialization module 114.

Figure 5:
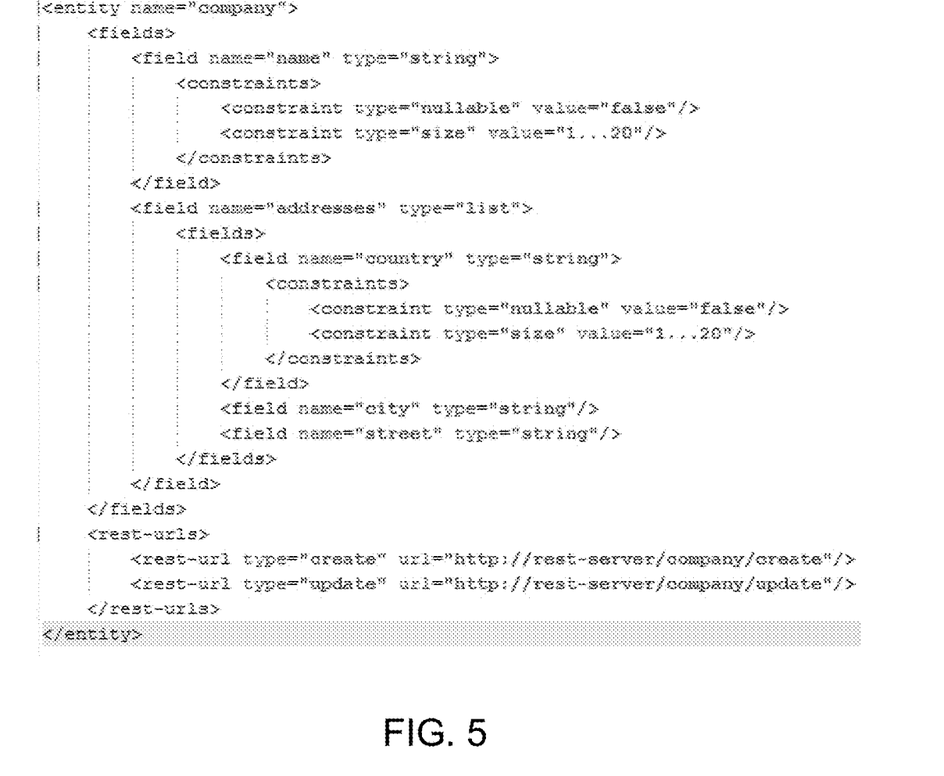
FIG. 5 illustrates an example of a standardized entity schema.

At block 226, the web application 112 acquires, using the entity adapter of the entity adapters 118 that is associated with the selected database entity, a standardized schema of the selected database entity (e.g., in XML, JSON, etc.). As described above with respect to the block 224, the block 226 can be performed, for example, by the associated entity adapter from the entity adapters 118 or the initialization module 114. In many cases, the block 226 can include the associated entity adapter translating an entity schema of the selected database entity into the standardized schema. FIG. 5 illustrates an example of a standardized entity schema 500. At block 228, the web application 112 transmits the standardized schema to the loaded form-generator client application. At block 230, the loaded form-generator client application receives the standardized schema.

Figure 6:
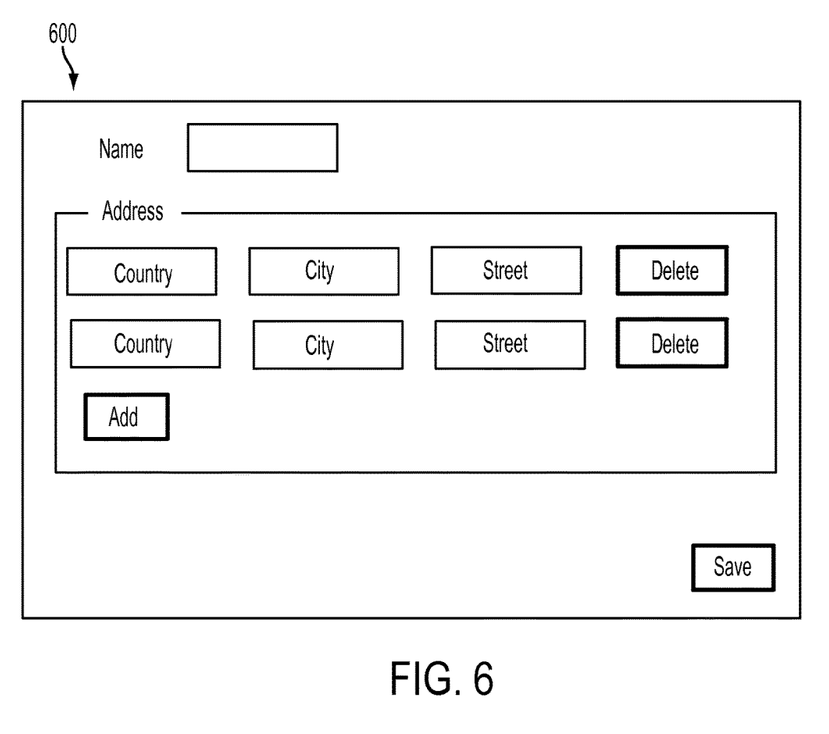
FIG. 6 illustrates an example of a dynamically-generated client-side database form.

At block 232, the loaded form-generator client application uses the standardized schema to dynamically generate a client-side database form. In a typical embodiment, the client-side database form is dynamically generated in accordance with a structure of the selected database entity as represented by the standardized schema. At block 234, the dynamically-generated client-side database form is made available for the user to use. FIG. 6 illustrates an example of a dynamically-generated client-side database form 600 that can be made available for use by the user.

At block 236, the dynamically-generated client-side database form interacts with the data access service 120 to perform, as directed by the user, one or more persistent storage operations on the selected database entity. As described above, in some embodiments, the dynamically-generated client-side database form and the data access service 120 can interact in a RESTful fashion. In a typical embodiment, data can be exchanged between the data access service 120 and the client-side database form via XML, JSON, and/or the like.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, on a backend computing system comprising at least one server computer:
centrally maintaining a plurality of form-generator client applications;
centrally maintaining a plurality of entity adapters, each entity adapter providing a standard interface to one or more of a plurality of database entities, the plurality of database entities logically representing data stored in a database on the backend computing system;
allowing a user of a client device to select a form-generation category from a plurality of form-generation categories;

identifying a form-generator client application of the plurality of form-generator client applications that is appropriate for the form-generation category;

generating a webpage comprising a reference to a network location of the form-generator client application;

serving the webpage to the client device;

receiving, at the network location, a request from the client device for the form-generator client application;

supplying the form-generator client application to the client device so that the form-generator client application can be loaded on the client device;

receiving, from the loaded form-generator client application, a request for an entity schema of at least one database entity of the plurality of database entities;

acquiring, using an entity adapter of the plurality of entity adapters that is associated with the at least one database entity, a standardized schema for the at least one database entity;

transmitting the standardized schema to the loaded form-generator client application so that a client-side database form can be dynamically generated by the loaded form-generator client application, on the client device, in accordance with a structure of the at least one database entity as represented by the standardized schema;

providing, to the dynamically-generated client-side database form, a web application programming interface (API) for performing a set of persistent storage operations, wherein the web API defines the set of persistent storage operations in terms of hypertext transfer protocol methods;

receiving, via the web API, from the dynamically-generated client-side database form on the client device, one or more persistent storage operations of the set relative to the at least one database entity; and performing the one or more persistent storage operations in the database relative to the at least one database entity.

2. The method of claim 1, wherein the web API comprises a RESTful web API.

3. The method of claim 1, wherein the set of persistent storage operations comprise create, read, update, and delete operations.

4. The method of claim 1, wherein the set of persistent storage operations are restricted to create, read, update, and delete operations.

5. The method of claim 1, wherein the identified form-generator client application comprises a form-generator client application of the plurality of form-generator client applications that is mapped to the selected form-generation category.

6. The method of claim 1, wherein the selected form-generation category is selected from the group consisting of: a name of a particular database, a name of a particular database table, and a functional category of data.

7. The method of claim 1, wherein the acquiring comprises translating an entity schema of the at least one database entity into the standardized schema.

8. The method of claim 1, comprising:
translating, via the entity adapter, the one or more persistent storage operations into one or more corresponding calls to the at least one database entity; and
wherein the performing comprises performing the one or more persistent storage operations in the database relative to the at least one database entity using the one or more corresponding calls.

9. The method of claim 1, wherein the webpage comprises a plurality of initialization parameters for the form-generator client application.

10. An information handling system comprising a processor and memory, wherein the processor and memory in combination are operable to implement a method comprising:

centrally maintaining a plurality of form-generator client applications;

centrally maintaining a plurality of entity adapters, each entity adapter providing a standard interface to one or more of a plurality of database entities, the plurality of database entities logically representing data stored in a database on the backend computing system;

allowing a user of a client device to select a form-generation category from a plurality of form-generation categories;

identifying a form-generator client application of the plurality of form-generator client applications that is appropriate for the form-generation category;

generating a webpage comprising a reference to a network location of the form-generator client application;

serving the webpage to the client device;

receiving, at the network location, a request from the client device for the form-generator client application;

supplying the form-generator client application to the client device so that the form-generator client application can be loaded on the client device;

receiving, from the loaded form-generator client application, a request for an entity schema of at least one database entity of the plurality of database entities;

acquiring, using an entity adapter of the plurality of entity adapters that is associated with the at least one database entity, a standardized schema for the at least one database entity;

transmitting the standardized schema to the loaded form-generator client application so that a client-side database form can be dynamically generated by the loaded form-generator client application, on the client device, in accordance with a structure of the at least one database entity as represented by the standardized schema;

providing, to the dynamically-generated client-side database form, a web application programming interface (API) for performing a set of persistent storage operations, wherein the web API defines the set of persistent storage operations in terms of hypertext transfer protocol methods;

receiving, via the web API, from the dynamically-generated client-side database form on the client device, one or more persistent storage operations of the set relative to the at least one database entity; and performing the one or more persistent storage operations in the database relative to the at least one database entity.

11. The information handling system of claim 10, the method wherein the web API comprises a RESTful web API.

12. The information handling system of claim 10, wherein the set of persistent storage operations comprise create, read, update, and delete operations.

13. The method of claim 10, wherein the set of persistent storage operations are restricted to create, read, update, and delete operations.

14. The information handling system of claim 10, wherein the identified form-generator client application comprises a form-generator client application of the plurality of form-generator client applications that is mapped to the selected form-generation category.

15. The information handling system of claim 10, wherein the selected form-generation category is selected from the group consisting of: a name of a particular database, a name of a particular database table, and a functional category of data.

16. The information handling system of claim 10, wherein the acquiring comprises translating an entity schema of the at least one database entity into the standardized schema.

17. The information handling system of claim 10, the method comprising:
  translating, via the entity adapter, the one or more persistent storage operations into one or more corresponding calls to the at least one database entity; and
  wherein the performing comprises performing the one or more persistent storage operations in the database relative to the at least one database entity using the one or more corresponding calls.

18. The information handling system of claim 10, wherein the webpage comprises a plurality of initialization parameters for the form-generator client application.

19. A computer-program product comprising a non-transitory computer-usable medium having computer-readable program code embodied therein, the computer-readable program code adapted to be executed to implement a method comprising:
  centrally maintaining a plurality of form-generator client applications;
  centrally maintaining a plurality of entity adapters, each entity adapter providing a standard interface to one or more of a plurality of database entities, the plurality of database entities logically representing data stored in a database on the backend computing system;
  allowing a user of a client device to select a form-generation category from a plurality of form-generation categories;
  identifying a form-generator client application of the plurality of form-generator client applications that is appropriate for the form-generation category;
  generating a webpage comprising a reference to a network location of the form-generator client application;
  serving the webpage to the client device;
  receiving, at the network location, a request from the client device for the form-generator client application;
  supplying the form-generator client application to the client device so that the form-generator client application can be loaded on the client device;
  receiving, from the loaded form-generator client application, a request for an entity schema of at least one database entity of the plurality of database entities;
  acquiring, using an entity adapter of the plurality of entity adapters that is associated with the at least one database entity, a standardized schema for the at least one database entity;
  transmitting the standardized schema to the loaded form-generator client application so that a client-side database form can be dynamically generated by the loaded form-generator client application, on the client device, in accordance with a structure of the at least one database entity as represented by the standardized schema;
  providing, to the dynamically-generated client-side database form, a web application programming interface (API) for performing a set of persistent storage operations, wherein the web API defines the set of persistent storage operations in terms of hypertext transfer protocol methods;
  receiving, via the web API, from the dynamically-generated client-side database form on the client device, one or more persistent storage operations of the set relative to the at least one database entity; and
  performing the one or more persistent storage operations in the database relative to the at least one database entity.

20. The computer-program product of claim 19, the method wherein the web API comprises a RESTful web API.

\* \* \* \* \*